(12) United States Patent
      Feng

(10) Patent No.: US 12,623,552 B2
(45) Date of Patent: May 12, 2026

(54) METHOD, VEHICLE AND STORAGE MEDIUM FOR VEHICLE ACCELERATION SLIP REGULATING

(71) Applicant: Xiaomi EV Technology Co., Ltd., Beijing (CN)

(72) Inventor: Maolin Feng, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 178 days.

(21) Appl. No.: 18/425,134

(22) Filed: Jan. 29, 2024

(65) Prior Publication Data
      US 2025/0001873 A1      Jan. 2, 2025

(30) Foreign Application Priority Data

Jun. 28, 2023   (CN) ......................... 202310782841.1

(51) Int. Cl.
      *B60L 15/20*      (2006.01)
      *B60W 10/08*      (2006.01)
      *B60W 30/18*      (2012.01)
(52) U.S. Cl.
      CPC ............. *B60L 15/20* (2013.01); *B60W 10/08* (2013.01); *B60W 30/18172* (2013.01); *B60L 2240/12* (2013.01); *B60L 2240/461* (2013.01); *B60L 2240/463* (2013.01); *B60L 2240/465* (2013.01); *B60L 2250/28* (2013.01)
(58) Field of Classification Search
      None
      See application file for complete search history.

(56) References Cited

U.S. PATENT DOCUMENTS

| | | | |
|---|---|---|---|
| 6,154,702 A | 11/2000 | Fodor et al. | |
| 8,718,897 B2 * | 5/2014 | Wright | B60L 15/32 |
| | | | 701/91 |
| 12,319,154 B2 * | 6/2025 | Yoon | B60L 3/106 |
| 2015/0274159 A1 | 10/2015 | Lu et al. | |

(Continued)

FOREIGN PATENT DOCUMENTS

| | | |
|---|---|---|
| CN | 109515206 A | 3/2019 |
| CN | 111143940 A | 5/2020 |
| CN | 111267635 A | 6/2020 |

(Continued)

OTHER PUBLICATIONS

Extended European Search Report issued on Jul. 15, 2024 for European Patent Application No. 24155797.4.

*Primary Examiner* — Todd Melton
(74) *Attorney, Agent, or Firm* — Volpe Koenig

(57)                ABSTRACT

The disclosure relates to a method, vehicle and storage medium for vehicle acceleration slip regulating in the technical field of vehicle control, and the method includes: obtaining a vehicle speed, state information of a driving motor, and an accelerator pedal opening degree of the vehicle at a current time; predicting a target wheel torque of the vehicle according to the state information of the driving motor at the current time and state information of the driving motor at a last time of the current time; and performing acceleration slip regulation on the vehicle according to a driving mode, the vehicle speed, the accelerator pedal opening degree, a motor output torque in the state information of the driving motor and the target wheel torque at the current time.

20 Claims, 3 Drawing Sheets

(56)                    References Cited

U.S. PATENT DOCUMENTS

2023/0115854 A1 *    4/2023   Iwama .................... B60L 3/102
701/22

FOREIGN PATENT DOCUMENTS

| CN | 114750762 A | 7/2022 |
| CN | 114771266 A | 7/2022 |
| JP | 2008-037184 B2 | 2/2008 |

* cited by examiner

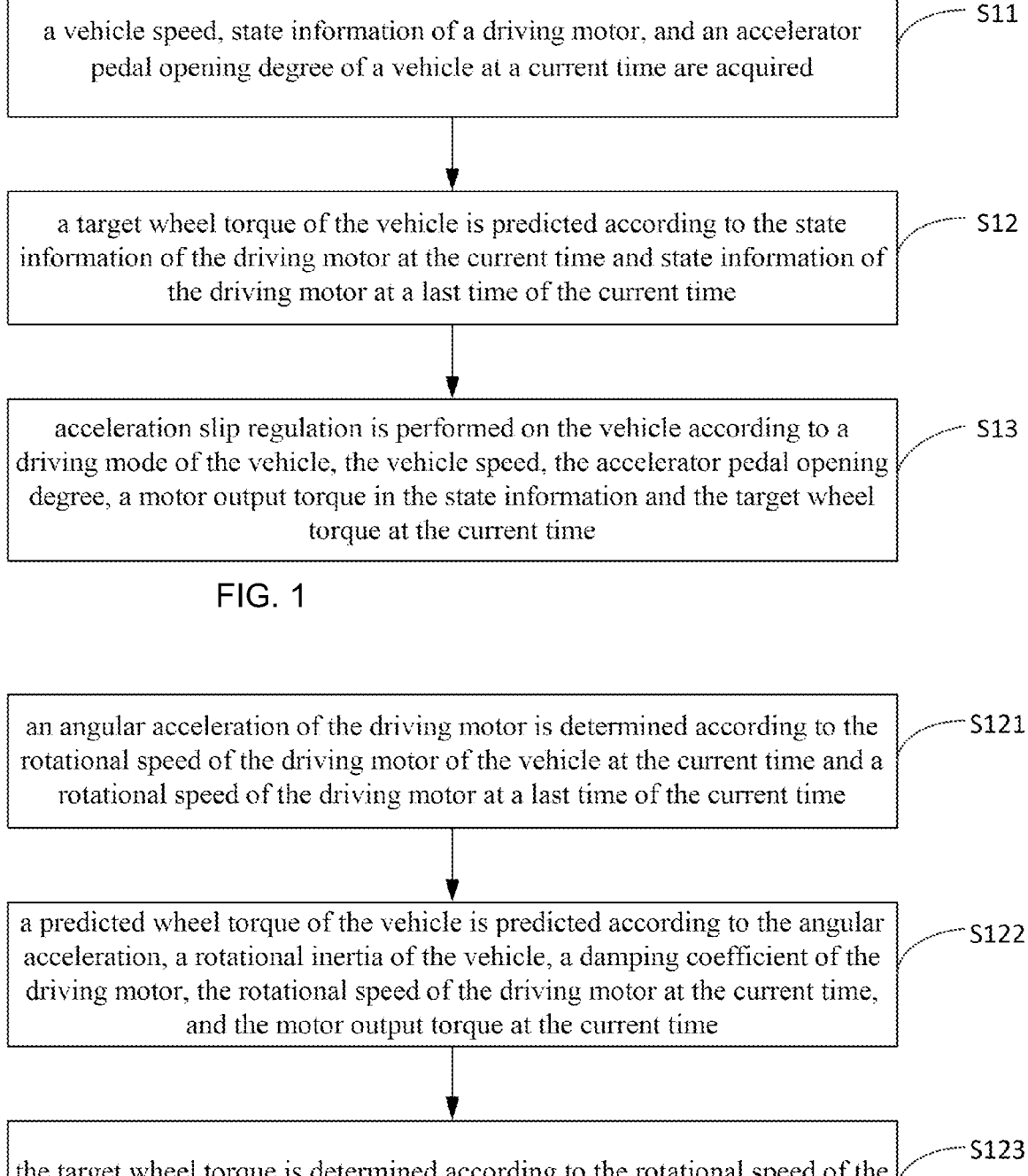

a vehicle speed, state information of a driving motor, and an accelerator pedal opening degree of a vehicle at a current time are acquired ⟋— S11 a target wheel torque of the vehicle is predicted according to the state information of the driving motor at the current time and state information of the driving motor at a last time of the current time ⟋— S12 acceleration slip regulation is performed on the vehicle according to a driving mode of the vehicle, the vehicle speed, the accelerator pedal opening degree, a motor output torque in the state information and the target wheel torque at the current time ⟋— S13

FIG. 1 an angular acceleration of the driving motor is determined according to the rotational speed of the driving motor of the vehicle at the current time and a rotational speed of the driving motor at a last time of the current time ⟋— S121 a predicted wheel torque of the vehicle is predicted according to the angular acceleration, a rotational inertia of the vehicle, a damping coefficient of the driving motor, the rotational speed of the driving motor at the current time, and the motor output torque at the current time ⟋— S122 the target wheel torque is determined according to the rotational speed of the driving motor at the current time and the predicted wheel torque ⟋— S123

FIG. 2

METHOD, VEHICLE AND STORAGE MEDIUM FOR VEHICLE ACCELERATION SLIP REGULATING

CROSS-REFERENCE TO RELATED APPLICATIONS

The present application claims priority benefits to Chinese Patent Application No. 202310782841.1 filed on Jun. 28, 2023, the contents of which are incorporated herein by reference.

BACKGROUND OF THE INVENTION

Traction control system (TCS) is a system for suppressing skid of driving wheels of a vehicle, typically, the TCS determines a reference vehicle speed according to the obtained driving wheel speed and an acceleration in an inertial sensor signal, and determines a target slip ratio according to the estimated road adhesion coefficient and a vehicle speed, thus taking the sum of the target slip ratio and the reference vehicle speed as a target drive shaft speed, and if an actual drive shaft speed is greater than the target drive shaft speed, the TCS is activated to reduce the actual drive shaft speed by reducing a driving torque, thus achieving vehicle anti slip driving.

SUMMARY OF THE INVENTION

The disclosure provides a method, vehicle and storage medium for vehicle acceleration slip regulating.

According to a first aspect of the examples of the disclosure, provides a method for vehicle acceleration slip regulating, including:

obtaining a vehicle speed, state information of a driving motor, and an accelerator pedal opening degree of the vehicle at a current time;

predicting a target wheel torque of the vehicle according to the state information of the driving motor at the current time and state information of the driving motor at a last time of the current time; and performing acceleration slip regulation on the vehicle according to a driving mode, the vehicle speed, the accelerator pedal opening degree, a motor output torque in the state information of the driving motor and the target wheel torque at the current time.

Optionally, the step of performing acceleration slip regulation on the vehicle according to a driving mode, the vehicle speed, the accelerator pedal opening degree, a motor output torque in the state information of the driving motor, and the target wheel torque at the current time includes:

determining a requested motor torque of the vehicle at the current time according to the vehicle speed of the vehicle and the accelerator pedal opening degree at the current time;

determining a torque threshold of the vehicle at the current time according to the vehicle speed and the driving mode of the vehicle at the current time; and performing acceleration slip regulation on the vehicle according to the motor output torque in the state information of the driving motor, the requested motor torque, the target wheel torque, and the torque threshold at the current time.

Optionally, the step of performing acceleration slip regulation on the vehicle according to the motor output torque in the state information of the driving motor, the requested motor torque, the target wheel torque, and the torque threshold at the current time includes:

determining a torque control value according to the motor output torque in the state information of the driving motor and the target wheel torque at the current time; and performing acceleration slip regulation for reducing the requested motor torque with the target wheel torque as a target in a case where the torque control value is greater than the torque threshold on the vehicle.

Optionally, the step of performing acceleration slip regulation for reducing the requested motor torque with the target wheel torque as a target in a case where the torque control value is greater than the torque threshold on the vehicle includes:

determining a magnitude relationship between a difference between the torque control value and the torque threshold and a preset difference threshold in the case where the torque control value is greater than the torque threshold;

performing acceleration slip regulation on the vehicle by reducing the requested motor torque to the target wheel torque within a preset period of time in a case where the difference between the torque control value and the torque threshold is greater than or equal to the preset difference threshold; or performing acceleration slip regulation on the vehicle by reducing the requested motor torque to the target wheel torque according to a preset gradient in a case where the difference between the torque control value and the torque threshold is less than the preset difference threshold.

Optionally, the step of determining the torque control value according to the motor output torque in the state information of the driving motor and the target wheel torque at the current time includes:

calculating a torque difference value between the motor output torque in the state information of the driving motor and the target wheel torque at the current time, and determining the torque difference value as the torque control value at the current time; or calculating a torque quotient of the motor output torque in the state information of the driving motor and the target wheel torque at the current time, and determining the torque quotient as the torque control value at the current time.

Optionally, the state information of the driving motor includes a rotational speed of the driving motor; and the step of predicting the target wheel torque of the vehicle according to the state information of the driving motor at the current time and the state information of the driving motor at the last time of the current time includes:

determining an angular acceleration of the driving motor according to the rotational speed of the driving motor of the vehicle at the current time and a rotational speed of the driving motor at a last time of the current time;

predicting a predicted wheel torque of the vehicle according to the angular acceleration, a rotational inertia of the vehicle, a damping coefficient of the driving motor, the rotational speed of the driving motor at the current time, and the motor output torque at the current time; and determining the target wheel torque according to the rotational speed of the driving motor and the predicted wheel torque at the current time.

Optionally, the step of determining the target wheel torque according to the rotational speed of the driving motor and the predicted wheel torque at the current time includes:

repeating the following steps:

determining a predicted motor rotational speed corresponding to the predicted wheel torque provided by the driving motor;

determining a torque compensation amount according to the predicted motor rotational speed and the rotational speed of the driving motor at the current time;

obtaining a deviation rectification wheel torque for compensating the predicted wheel torque according to the torque compensation amount in a case where the torque compensation amount satisfies a torque compensation condition;

taking the deviation rectification wheel torque as the motor output torque of the driving motor at the current time, and predicting again a predicted wheel torque of the vehicle according to the angular acceleration, the rotational inertia of the vehicle, the damping coefficient of the driving motor, the rotational speed of the driving motor and the deviation rectification wheel torque at the current time; and taking the predicted wheel torque as the target wheel torque until the torque compensation amount does not satisfy the torque compensation condition.

Optionally, the predicted wheel torque Tload of the vehicle is predicted by the following calculation formula:

$$w_a = (T_M - k \times w_v - T_{load})/J$$

where $w_a$ is the angular acceleration, J is the rotational inertia of the vehicle, k is the damping coefficient of the driving motor, $w_v$ is the rotational speed of the driving motor at the current time, and $T_M$ is the motor output torque of the driving motor at the current time.

According to a second aspect of the examples of the disclosure, provides a vehicle, including:

a first processor; and a first memory configured to store instructions which can be executed by the first processor;

where the first processor is configured to:

obtain a vehicle speed, state information of a driving motor, and an accelerator pedal opening degree of the vehicle at a current time;

predict a target wheel torque of the vehicle according to the state information of the driving motor at the current time and state information of the driving motor at a last time of the current time; and perform acceleration slip regulation on the vehicle according to a driving mode, the vehicle speed, the accelerator pedal opening degree, a motor output torque in the state information of the driving motor and the target wheel torque at the current time.

According to a third aspect of the examples of the disclosure, provides a computer-readable storage medium, having computer program instructions stored, where when the program instructions are executed by a second processor, the steps of the method for vehicle acceleration slip regulating provided in the first aspect of the disclosure are implemented.

It should be understood that the above general description and the following detailed description are only explanatory and illustrative, and cannot limit the disclosure.

BRIEF DESCRIPTION OF DRAWINGS

The drawings here are incorporated into and constitute part of the description, illustrating the examples conforming to the disclosure, and are used together with the description to interpret the principles of the disclosure.

FIG. 1 is a flow chart of a method for vehicle acceleration slip regulating shown according to an example.

FIG. 2 is a block diagram of one implementation of Step S12 in FIG. 1 shown according to an example.

DETAILED DESCRIPTION OF THE INVENTION

Figure 3:
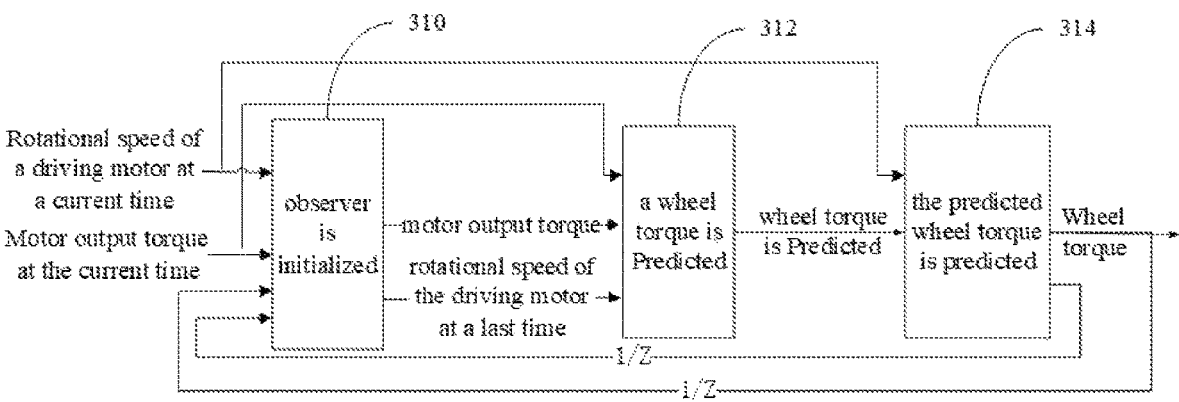
FIG. 3 is a flow chart of predicting a target wheel torque of a vehicle shown according to an example.

Examples will be described in detail here, instances of which are shown in accompanying drawings. When the following description relates to the accompanying drawings, unless otherwise indicated, the same numbers in the different accompanying drawings represent the same or similar elements. The embodiments described in the following examples do not represent all embodiments consistent with the disclosure. On the contrary, they are merely examples of devices and methods consistent with some aspects of the disclosure as detailed in the appended claims.

It should be noted that all actions of obtaining signals, information or data in this application are carried out under the premise of complying with the corresponding data protection regulations and policies of the country of the locality and with the authorization given by an owner of the corresponding device.

The disclosure relates to the technical field of vehicle control, in particular to method, apparatus, vehicle and storage medium for vehicle acceleration slip regulating.

In order to ensure the robustness of the TCS and prevent false triggering of the TCS, when the vehicle is stationary, i.e., when the vehicle speed is 0 m/s, the target drive shaft speed is not the same as the reference vehicle speed, but slightly greater than the reference vehicle speed. Thus, the problem is caused that when driving wheels skid at the start of the vehicle, the TCS does not activate torque reduction immediately, and activates the torque reduction only when the skid amount exceeds a certain threshold, but in this case, the driving wheel speed is already high, and thus, vehicle anti slip driving cannot be achieved accurately and quickly.

In order to solve the problems existing in the related art, FIG. 1 is a flow chart of a method for vehicle acceleration slip regulating shown according to an example, and the method for vehicle acceleration slip regulating can be performed by a vehicle control unit, a chassis domain controller, an electronic stability program, and as shown in FIG. 1, includes the following steps.

In Step S11, a vehicle speed, state information of a driving motor, and an accelerator pedal opening degree of a vehicle at a current time are obtained.

In the examples of the disclosure, the vehicle speed, the state information of the driving motor, and the accelerator pedal opening degree are obtained at each time.

In the examples of the disclosure, the vehicle speed of the vehicle at the current time may be obtained by a vehicle speed sensor configured on a transmission of the vehicle, and a wheel speed of the vehicle may be obtained by a wheel speed sensor configured on the vehicle, and converted into the vehicle speed of the vehicle at the current time. The state information of the driving motor at the current time may be obtained by a sensor configured on the driving motor, and the accelerator pedal opening degree at the current time may be directly obtained from the vehicle control unit or may be directly obtained from a stroke switch of an accelerator pedal.

In Step S12, a target wheel torque of the vehicle is predicted according to the state information of the driving motor at the current time and state information of the driving motor at a last time of the current time.

Where the state information of the driving motor at the current time and the state information of the driving motor at the last time of the current time can be inputted into a Luenberger observer to predict the target wheel torque of the vehicle, and the Luenberger observer can be constructed according to a rotational inertia of the vehicle and a damping coefficient of the driving motor.

It may be explained that the rotational inertia of the vehicle is determined by transmission components of the vehicle, that is, different vehicles may have different rotational inertia or vehicles of the same vehicle model have the same rotational inertia, and the rotational inertia may be stored on the vehicle by pre-calibration.

The damping coefficient of the driving motor is generally determined by the characteristics of the driving motor.

The wheel torque involved in the disclosure is generally determined by a product of a motor output torque and a speed ratio of a speed reducer, while a frictional force on the ground to the wheels will affect the output of the wheel torque.

Optionally, the state information of the driving motor includes a rotational speed of the driving motor. Referring to FIG. 2, in Step S12, the step of a target wheel torque of the vehicle is predicted according to the state information of the driving motor at the current time and state information of the driving motor at a last time of the current time includes the following steps.

In Step S121, an angular acceleration of the driving motor is determined according to the rotational speed of the driving motor of the vehicle at the current time and a rotational speed of the driving motor at a last time of the current time.

Where the angular acceleration of the driving motor is determined based on a Luenberger observer, and the Luenberger observer first needs to be initialized by the rotational speed of the driving motor at the current time, and then the subsequent steps are performed.

It can be understood that the rotational speed of the driving motor of the vehicle at the current time is the sum of the rotational speed of the driving motor at the last time of the current time and an integral of the angular acceleration of the driving motor over time, i.e., $$w = w_0 + w_a \times dt \qquad (1)$$

where w is the rotational speed of the driving motor of the vehicle at the current time, $w_0$ is the rotational speed of the driving motor at the last time of the current time, $w_a$ is the angular acceleration of the driving motor, and dt represents integrating over time.

In Step S122, a predicted wheel torque of the vehicle is predicted according to the angular acceleration, a rotational inertia of the vehicle, a damping coefficient of the driving motor, the rotational speed of the driving motor at the current time, and the motor output torque at the current time.

Optionally, the predicted wheel torque Tload of the vehicle is predicted by the following calculation formula:

$$w_a = (T_M - k \times w_v - T_{load})/J \qquad (2)$$

where $w_a$ is the angular acceleration, J is the rotational inertia of the vehicle, k is the damping coefficient of the driving motor, $w_v$ is the rotational speed of the driving motor at the current time, and $T_M$ is the motor output torque at the current time In Step S123, the target wheel torque is determined according to the rotational speed of the driving motor at the current time and the predicted wheel torque.

In the examples of the disclosure, it is determined whether deviation rectification needs to be performed on the predicted wheel torque according to a difference between the rotational speed of the driving motor at the current time and a predicted motor rotational speed corresponding to the predicted wheel torque, then in a case where deviation rectification needs to be performed on the predicted wheel torque, deviation rectification is performed on the predicted wheel torque to obtain a deviation rectification wheel torque, a predicted wheel torque of the vehicle is predicted again by taking the deviation rectification wheel torque as the motor output torque at the current time until there is no need to perform deviation rectification on the predicted wheel torque, and further, in a case where there is no need to perform deviation rectification on the predicted wheel torque, the predicted wheel torque is determined as the target wheel torque.

In this step S123, the step of determining the target wheel torque according to the rotational speed of the driving motor and the predicted wheel torque at the current time includes:

repeating the following steps:

a predicted motor rotational speed corresponding to the predicted wheel torque provided by the driving motor is determined.

During specific implementation of the disclosure, the wheel torque can be determined according to a product of the motor output torque and a speed ratio of a Reducer, thus reversing the motor output torque based on a fixed speed ratio of the Reducer and the known wheel torque, thus determining the predicted motor rotational speed corresponding to the motor output torque according to the characteristics of the driving motor.

A torque compensation amount is determined according to the predicted motor rotational speed and the rotational speed of the driving motor at the current time.

In the examples of the disclosure, the torque compensation amount is determined according to a rotational speed difference between the predicted motor rotational speed and the rotational speed of the driving motor at the current time. For example, a magnitude of this rotational speed difference is taken as a magnitude of the torque compensation amount.

In a case where the torque compensation amount satisfies a torque compensation condition, the predicted wheel torque is compensated according to the torque compensation amount to obtain a deviation rectification wheel torque.

The torque compensation condition may be whether the torque compensation amount is within a torque compensation range, for example, whether the torque compensation amount is greater than 0, and at this time, the torque compensation range is 0 to infinity, or whether the torque compensation amount is greater than a preset compensation threshold, and at this time, the torque compensation range is the preset compensation threshold to infinity.

In the case where the torque compensation amount satisfies the torque compensation condition, the sum of the torque compensation amount and the predicted wheel torque is calculated to obtain the deviation rectification wheel torque.

The deviation rectification wheel torque is taken as the motor output torque at the current time, and a predicted wheel torque of the vehicle is predicted again according to the angular acceleration, the rotational inertia of the vehicle, the damping coefficient of the driving motor, the rotational speed of the driving motor at the current time, and the deviation rectification wheel torque.

In this step, the deviation rectification wheel torque is fed back into a Luenberger observer as the motor output torque at the current time, that is, as a front feedback, then the predicted wheel torque of the vehicle is predicted again according to the foregoing formula (2), and the prediction and the front feedback are constantly performed until the torque compensation amount does not satisfy the torque compensation condition.

The predicted wheel torque is taken as the target wheel torque until the torque compensation amount does not satisfy the torque compensation condition.

Referring to FIG. 3, the Luenberger observer is initialized at 310 based on the rotational speed of the driving motor at the current time and the motor output torque to avoid the influence of the state information at the last time. Then the method in the previous example is executed at 312 to predict the wheel torque according to the motor output torque at the current time and the state information of the driving motor at the last time of the current time, the state information of the driving motor at the last time of the current time such as the rotational speed of the driving motor at the last time of the current time. Then the predicted wheel torque is subjected to deviation rectification according to the rotational speed of the driving motor at the current time, and the wheel torque is predicted again at 314 according to the deviation rectification wheel torque obtained after deviation rectification, where Z shown in FIG. 3 is a state transfer parameter. Finally, in a case where the torque compensation amount does not satisfy the torque compensation condition, the predicted wheel torque is taken as the target wheel torque.

In Step S13, acceleration slip regulation is performed on the vehicle according to a driving mode of the vehicle, the vehicle speed, the accelerator pedal opening degree, a motor output torque in the state information and the target wheel torque at the current time.

The technical solutions provided by the examples of the disclosure may include the following beneficial effects:

by obtaining a vehicle speed, state information of a driving motor, and an accelerator pedal opening degree of the vehicle at a current time; and predicting a target wheel torque of the vehicle according to the state information of the driving motor at the current time and state information of the driving motor at a last time of the current time, a wheel torque can be predicted which formed by a frictional resistance on the ground, thus improving the accuracy of subsequent control; and then acceleration slip regulation is performed on the vehicle according to a driving mode, the vehicle speed, the accelerator pedal opening degree, a motor output torque in the state information of the driving motor, and the target wheel torque at the current time. Considering motor output torques under different driving modes, vehicle speeds and accelerator pedal opening degrees, the current driving state can be better matched, then sufficient adhesion can be provided for wheels of a vehicle, the probability of wheel slip can be reduced, and the vehicle driving capability can be enhanced.

In a specific implementation, in the step S13, the step of acceleration slip regulation is performed on the vehicle according to a driving mode of the vehicle, the vehicle speed, the accelerator pedal opening degree, a motor output torque in the state information and the target wheel torque at the current time includes:

a requested motor torque of the vehicle at the current time is determined according to the vehicle speed of the vehicle and the accelerator pedal opening degree at the current time.

In the examples of the disclosure, a table of the vehicle speed, the accelerator pedal opening degree and the requested motor torque is established in advance, and the requested motor torque of the vehicle at the current time is determined by looking up the table through the vehicle speed and the accelerator pedal opening degree at the current time.

A torque threshold of the vehicle at the current time is determined according to the vehicle speed and the driving mode of the vehicle at the current time.

Similarly, a table of the vehicle speed, the driving mode and the torque threshold is established in advance. For example, a torque threshold corresponding to a sports mode is larger while a torque threshold corresponding to a comfort mode is smaller. The torque threshold of the vehicle at the current time is determined by looking up the table through the vehicle speed and the driving mode at the current time.

Acceleration slip regulation is performed on the vehicle according to the motor output torque in the state information of the driving motor, the requested motor torque, the target wheel torque, and the torque threshold at the current time.

In the examples of the disclosure, the step of acceleration slip regulation is performed on the vehicle according to the motor output torque in the state information of the driving motor, the requested motor torque, the target wheel torque, and the torque threshold at the current time includes:

a torque control value is determined according to the motor output torque in the state information of the driving motor at the current time and the target wheel torque.

In one embodiment, a torque difference value between the motor output torque in the state information of the driving motor and the target wheel torque may be calculated at the current time, and the torque difference value may be taken as the torque control value.

In another embodiment, a torque ratio of the motor output torque in the state information of the driving motor to the target wheel torque may be calculated at the current time, and the torque ratio may be used as the torque control value.

In a case where the torque control value is greater than the torque threshold, acceleration slip regulation is performed on the vehicle by reducing the requested motor torque with the target wheel torque as a target.

In the examples of the disclosure, reducing the requested motor torque with the target wheel torque as the target can be understood as reducing the requested motor torque until the requested motor torque is equal to the target wheel torque.

It can be understood that in a case where the torque control value is less than or equal to the torque threshold, the requested motor torque is equal to a demanded motor torque, so the driving motor may directly provide a torque to wheels according to the requested motor torque.

Optionally, the step of performing acceleration slip regulation on the vehicle by reducing the requested motor torque with the target wheel torque as a target in the case where the torque control value is greater than the torque threshold:

in the case where the torque control value is greater than the torque threshold, a magnitude relationship between a difference between the torque control value and the torque threshold and a preset difference threshold is determined.

In a case where the difference between the torque control value and the torque threshold is greater than or equal to the preset difference threshold, the requested motor torque is reduced to the target wheel torque within a preset period of time, and acceleration slip regulation is performed on the vehicle.

In a case where the difference between the torque control value and the torque threshold is less than the preset difference threshold, the requested motor torque is reduced to the target wheel torque according to a preset gradient, and acceleration slip regulation is performed on the vehicle.

In the examples of the disclosure, the preset gradient is a fixed value calibrated in advance so that the same torque is reduced every time. Reducing the requested motor torque to the target wheel torque within a preset period of time does not specify a reduction gradient, which may be performed by first reducing the torque with a greater gradient and then reducing the torque with a smaller gradient, the reduction gradient being related to the magnitude of the difference between the torque control value and the torque threshold relative to the preset difference threshold.

In the above technical solution, in the case where the difference between the torque control value and the torque threshold is greater than or equal to the preset difference threshold, the requested motor torque can be rapidly reduced to the target wheel torque, thus performing acceleration slip regulation on the vehicle in time. In the case where the difference between the torque control value and the torque threshold is less than the preset difference threshold, the requested motor torque may be smoothly reduced to the target wheel torque according to the preset gradient.

In the above technical solution, the vehicle speed of the vehicle, the state information of the driving motor, and the accelerator pedal opening degree at the current time are obtained. The target wheel torque of the vehicle is predicted according to the state information of the driving motor at the current time and the state information of the driving motor at the last time to the current time, so that the wheel torque that can be formed by a frictional resistance of a current ground can be predicted, thus improving the accuracy of subsequent control. Then acceleration slip regulation is performed on the vehicle according to the driving mode of the vehicle at the current time, the vehicle speed, the accelerator pedal opening degree, the motor output torque in the state information at the current time, and the target wheel torque. Considering motor output torques under different driving modes, vehicle speeds and accelerator pedal opening degrees, the current driving state can be better matched, then sufficient adhesion can be provided for the wheels of a vehicle, the probability of wheel slip can be reduced, and the vehicle driving capability can be enhanced.

Figure 4:
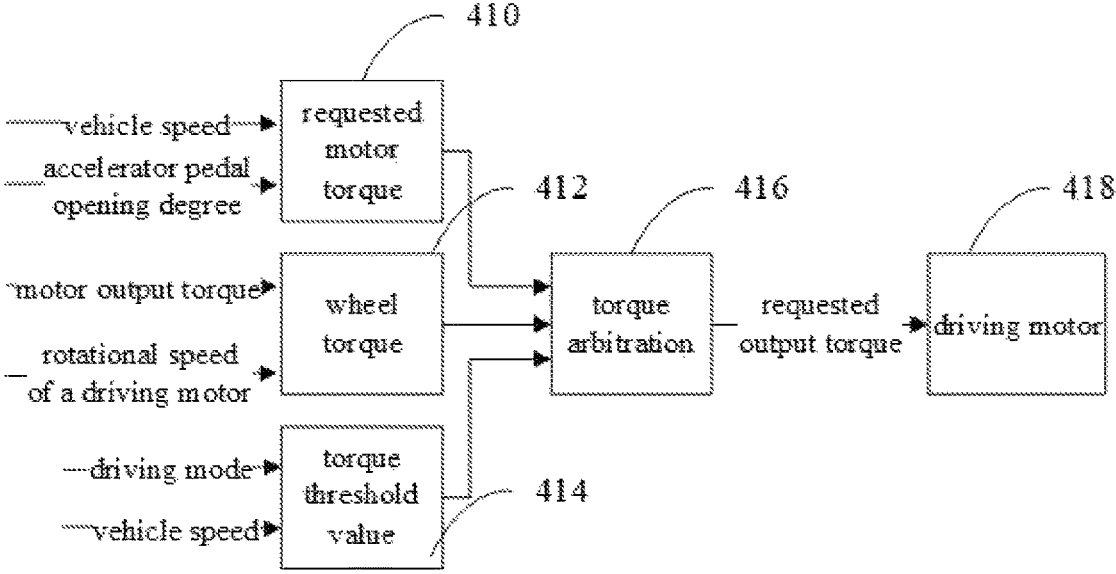
FIG. 4 is a flow chart of another method for vehicle acceleration slip regulating shown according to an example.

For example, the method for vehicle acceleration slip regulating provided by the disclosure is illustrated below by one example, referring to FIG. 4, first, the requested motor torque 410 is determined by looking up the table according to the vehicle speed and the accelerator pedal opening degree at the current time, and the wheel torque 412 is predicted according to the motor output torque and the rotational speed of the driving motor at the current time, and the method in the previous example is performed, the target wheel torque is determined, and the torque threshold 414 is determined by looking up the table according to the driving mode and the vehicle speed at the current time. Further, a requested output torque is arbitrated 416 according to the requested motor torque, the target wheel torque and the torque threshold to obtain the requested output torque, and executed by the driving motor 418.

The determination of the requested motor torque, the prediction of the wheel torque, and the determination of the torque threshold have no sequential relationship, the above example is only one embodiment, and the determination of the requested motor torque, the prediction of the wheel torque, and the determination of the torque threshold may be performed simultaneously or in a certain sequence, which is not limited in the disclosure.

Figure 5:
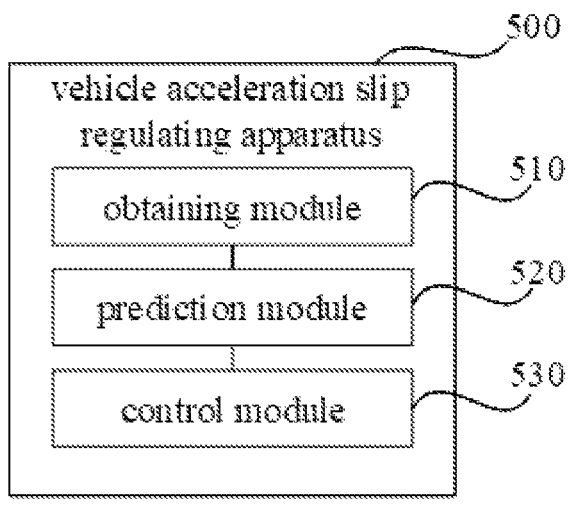
FIG. 5 is a block diagram of an apparatus for vehicle acceleration slip regulating shown according to an example.

Based on the same concept, an example of the disclosure further provides an apparatus for vehicle acceleration slip regulating, and FIG. 5 is a block diagram of an apparatus 500 for vehicle acceleration slip regulating shown according to an example. Referring to FIG. 5, the apparatus 500 for vehicle acceleration slip regulating includes an obtaining module 510, a prediction module 520, and a control module 530.

The obtaining module 510 is configured to obtain a vehicle speed, state information of a driving motor, and an accelerator pedal opening degree of a vehicle at a current time;

the predicting module 520 is configured to predict a target wheel torque of the vehicle according to the state information of the driving motor at the current time and state information of the driving motor at a last time of the current time; and the control module 530 is configured to perform acceleration slip regulation on the vehicle according to a driving mode of the vehicle, the vehicle speed, the accelerator pedal opening degree, a motor output torque in the state information of the driving motor at the current time, and the target wheel torque at the current time.

Optionally, the control module 530 is configured to:

determine a requested motor torque of the vehicle at the current time according to the vehicle speed of the vehicle and the accelerator pedal opening degree at the current time;

determine a torque threshold of the vehicle at the current time according to the vehicle speed and the driving mode of the vehicle at the current time; and performing acceleration slip regulation on the vehicle according to the motor output torque in the state information of the driving motor, the requested motor torque, the target wheel torque, and the torque threshold at the current time.

Optionally, the control module is configured to:

determine a torque control value according to the motor output torque in the state information of the driving motor and the target wheel torque at the current time; and perform acceleration slip regulation by reducing the requested motor torque with the target wheel torque as a target in a case where the torque control value is greater than the torque threshold on the vehicle.

Optionally, the control module is configured to:

determine a magnitude relationship between a difference between the torque control value and the torque threshold and a preset difference threshold in the case where the torque control value is greater than the torque threshold;

perform acceleration slip regulation on the vehicle by reducing the requested motor torque to the target wheel torque within a preset period of time in a case where the difference between the torque control value and the torque threshold is greater than or equal to the preset difference threshold; or perform acceleration slip regulation on the vehicle by reducing the requested motor torque to the target wheel torque according to a preset gradient in a case where the difference between the torque control value and the torque threshold is less than the preset difference threshold.

Optionally, the control module is configured to:

calculate a torque difference value between the motor output torque in the state information of the driving motor and the target wheel torque at the current time, and determining the torque difference value as the torque control value at the current time; or calculate a torque quotient of the motor output torque in the state information of the driving motor and the target wheel torque at the current time, and determining the torque quotient as the torque control value at the current time.

Optionally, the state information of the driving motor includes a rotational speed of the driving motor; and the prediction module is configured to:

determine an angular acceleration of the driving motor according to the rotational speed of the driving motor of the vehicle at the current time and a rotational speed of the driving motor at a last time of the current time;

predict a predicted wheel torque of the vehicle according to the angular acceleration, a rotational inertia of the vehicle, a damping coefficient of the driving motor, the rotational speed of the driving motor at the current time, and the motor output torque at the current time; and determine the target wheel torque according to the rotational speed of the driving motor and the predicted wheel torque at the current time.

Optionally, the prediction module is configured to:

repeat the following steps:

determining a predicted motor rotational speed corresponding to the predicted wheel torque provided by the driving motor;

determining a torque compensation amount according to the predicted motor rotational speed and the rotational speed of the driving motor at the current time;

obtaining a deviation rectification wheel torque for compensating the predicted wheel torque according to the torque compensation amount in a case where the torque compensation amount satisfies a torque compensation condition;

taking the deviation rectification wheel torque as the motor output torque of the driving motor at the current time, and predicting again a predicted wheel torque of the vehicle according to the angular acceleration, the rotational inertia of the vehicle, the damping coefficient of the driving motor, the rotational speed of the driving motor and the deviation rectification wheel torque at the current time; and taking the predicted wheel torque as the target wheel torque until the torque compensation amount does not satisfy the torque compensation condition.

Optionally, the predicted wheel torque Tload of the vehicle is predicted by the following calculation formula:

$$w_a = (T_M - k \times w_v - T_{load})/J$$

where $w_a$ is the angular acceleration, J is the rotational inertia of the vehicle, k is the damping coefficient of the driving motor, $w_v$ is the rotational speed of the driving motor at the current time, and $T_M$ is the motor output torque at the current time.

Regarding the apparatus 500 for vehicle acceleration slip regulating in the above example, a specific mode for each module to execute operation has been described in detail in the examples of the method, and will not be described in detail here.

It should be understood by those skilled in the art that the above example of the device is merely illustrative, for example, the division of modules is only one logical function division, and there may be other division modes in actual implementation, for example, a plurality of modules can be combined or integrated into one module. In addition, modules illustrated as separate components may or may not be physically separated. Also, each module may be implemented in whole or in part by software, hardware, firmware, or any combination of them. When implemented by the software, each module may be implemented in whole or in part in the form of a computer program product. When implemented by the hardware, each module may be implemented in whole or in part in the form of an integrated circuit or chip.

An example of the disclosure further provides a computer-readable storage medium, having computer program instructions stored, where when the program instructions are executed by a second processor, the steps of the method for vehicle acceleration slip regulating provided by any one of the foregoing examples of the disclosure are implemented.

An example of the disclosure further provides a vehicle, including:

a first processor; and a first memory configured to store instructions which can be executed by the first processor;

where the first processor is configured to:

obtain a vehicle speed of the vehicle, state information of a driving motor, and an accelerator pedal opening degree at a current time;

predict a target wheel torque of the vehicle according to the state information of the driving motor at the current time and state information of the driving motor at a last time of the current time based on a Luenberger observer which is constructed according to a rotational inertia of the vehicle and a damping coefficient of the driving motor; and perform acceleration slip regulation on the vehicle according to a driving mode of the vehicle at the current time, the vehicle speed, the accelerator pedal opening degree, a motor output torque in the state information at the current time, and the target wheel torque.

It may be explained that the first processor configured by the vehicle in the example of the disclosure can execute executable instructions stored in the first memory to implement the method for vehicle acceleration slip regulating provided by any one of the foregoing examples of the disclosure.

Figure 6:
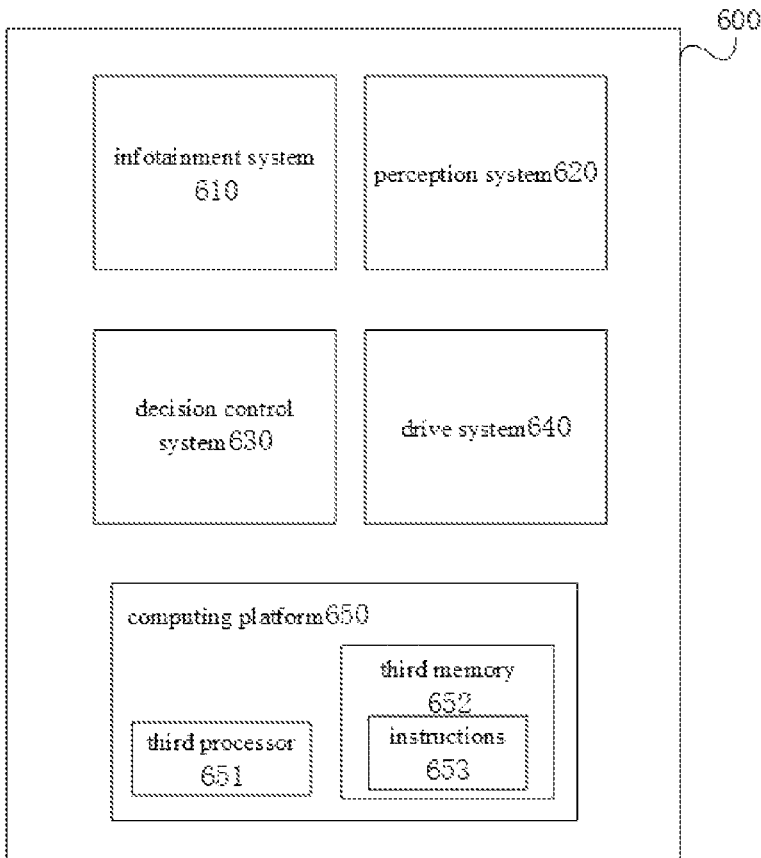
FIG. 6 is a functional block diagram of a vehicle shown according to an example.

FIG. 6 is a block diagram of a vehicle 600 shown according to an example. For example, the vehicle 600 may be a hybrid vehicle or a non-hybrid vehicle, an electric vehicle, a fuel cell vehicle, or other types of vehicles. The vehicle 600 may be an autonomous vehicle, a semi-autonomous vehicle, or a non-autonomous vehicle.

Referring to FIG. 6, the vehicle 600 may include various subsystems, such as an infotainment system 610, a perception system 620, a decision control system 630, a drive system 640, and a computing platform 650. The vehicle 600 may also include more or fewer subsystems, and each subsystem may include a plurality of components. In addition, interconnections between the subsystems and between the components of the vehicle 600 may be achieved in a wired or wireless manner.

In some examples, the infotainment system 610 may include a communication system, an entertainment system, a navigation system, and the like.

The perception system 620 may include a plurality of sensors configured to sense information of the environment surrounding the vehicle 600. For example, the perception system 620 may include a global positioning system (which may be a GPS system or a Beidou system or other positioning systems), an inertial measurement unit (IMU), a lidar, a millimeter wave radar, an ultrasonic radar, and a camera.

The decision control system 630 may include a computing system, a vehicle control unit, a steering system, a throttle, and a braking system.

The drive system 640 may include components that provide powered motion for the vehicle 600. In one example, the drive system 640 may include an engine, an energy source, a transmission system, and wheels. The engine may be one or a combination of more of an internal combustion engine, an electric motor, and an air compression engine. The engine can convert energy provided by the energy source into mechanical energy.

Some or all of the functions of the vehicle 600 are controlled by the computing platform 650. The computing platform 650 may include at least one third processor 651 and a third memory 652, and the third processors 651 may execute instructions 653 stored in the third memory 652.

The third processors 651 may be any conventional processor, such as a commercially available CPU. The processor may also include, for example, a graphic process unit (GPU), a field programmable gate array (FPGA), a system on chip (SOC), an application specific integrated chip (ASIC), or a combination of them.

The third memory 652 may be implemented by any type of volatile or non-volatile storage devices, or a combination of them, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

In addition to the instructions 653, the third memory 652 may store data such as road maps, route information, a location of a vehicle, a direction of the vehicle, a speed of the vehicle, and the like. The data stored in the third memory 652 may be used by the computing platform 650.

In the examples of the disclosure, the third processors 651 may execute the instructions 653 to complete all or part of the steps of the method for vehicle acceleration slip regulating described above.

Other examples of the disclosure will be readily conceived by those skilled in the art after taking into account the disclosure and practicing the disclosure. The disclosure is intended to cover any variation, use or adaptive changes of the disclosure, and the variations, uses or adaptive changes follow the general principles of the disclosure and include the common general knowledge or the conventional technical means in the art which is not disclosed by the disclosure. The description and the examples are merely regarded as an example, and the true scope and spirit of the disclosure are indicated by the following claims.

It should be understood that the disclosure is not limited to the precise structures that have been described above and shown in the drawings, and that various modifications and changes can be made without departing from the scope of the disclosure. The scope of the disclosure is limited only by the appended claims.

The invention claimed is:

1. A method for vehicle acceleration slip regulating comprising:

obtaining a vehicle speed, state information of a driving motor, and an accelerator pedal opening degree of the vehicle at a current time;

predicting a target wheel torque of the vehicle according to the state information of the driving motor at the current time and state information of the driving motor at a last time of the current time; and performing acceleration slip regulation on the vehicle according to a driving mode, the vehicle speed, the accelerator pedal opening degree, a motor output torque in the state information of the driving motor and the target wheel torque at the current time.

2. The method for vehicle acceleration slip regulating according to claim 1, wherein the step of performing acceleration slip regulation on the vehicle according to the driving mode, the vehicle speed, the accelerator pedal opening degree, the motor output torque in the state information of the driving motor, and the target wheel torque at the current time comprises:

determining a requested motor torque of the vehicle at the current time according to the vehicle speed of the vehicle and the accelerator pedal opening degree at the current time;

determining a torque threshold of the vehicle at the current time according to the vehicle speed and the driving mode of the vehicle at the current time; and performing acceleration slip regulation on the vehicle according to the motor output torque in the state information of the driving motor, the requested motor torque, the target wheel torque, and the torque threshold at the current time.

3. The method for vehicle acceleration slip regulating according to claim 2, wherein the step of performing acceleration slip regulation on the vehicle according to the motor output torque in the state information of the driving motor, the requested motor torque, the target wheel torque, and the torque threshold at the current time comprises:

determining a torque control value according to the motor output torque in the state information of the driving motor and the target wheel torque at the current time; and performing acceleration slip regulation by reducing the requested motor torque with the target wheel torque as a target in a case where the torque control value is greater than the torque threshold on the vehicle.

4. The method for vehicle acceleration slip regulating according to claim 3, wherein the step of performing acceleration slip regulation by reducing the requested motor torque with the target wheel torque as a target in a case where the torque control value is greater than the torque threshold on the vehicle comprises:

determining a magnitude relationship between a difference between the torque control value and the torque threshold and a preset difference threshold in the case where the torque control value is greater than the torque threshold; and performing acceleration slip regulation on the vehicle by reducing the requested motor torque to the target wheel torque within a preset period of time in a case where the difference between the torque control value and the torque threshold is greater than or equal to the preset difference threshold.

5. The method for vehicle acceleration slip regulating according to claim 4, wherein the method further comprises:

performing acceleration slip regulation on the vehicle by reducing the requested motor torque to the target wheel torque according to a preset gradient in a case where the difference between the torque control value and the torque threshold is less than the preset difference threshold.

6. The method for vehicle acceleration slip regulating according to claim 3, wherein the step of determining the torque control value according to the motor output torque in the state information of the driving motor and the target wheel torque at the current time comprises:

calculating a torque difference value between the motor output torque in the state information of the driving motor and the target wheel torque at the current time, and determining the torque difference value as the torque control value at the current time; or calculating a torque quotient of the motor output torque in the state information of the driving motor and the target wheel torque at the current time, and determining the torque quotient as the torque control value at the current time.

7. The method for vehicle acceleration slip regulating according to claim 1, wherein the state information of the driving motor comprises a rotational speed of the driving motor; and the step of predicting the target wheel torque of the vehicle according to the state information of the driving motor at the current time and the state information of the driving motor at the last time of the current time comprises:

determining an angular acceleration of the driving motor according to the rotational speed of the driving motor of the vehicle at the current time and a rotational speed of the driving motor at a last time of the current time;

predicting a predicted wheel torque of the vehicle according to the angular acceleration, a rotational inertia of the vehicle, a damping coefficient of the driving motor, the rotational speed of the driving motor at the current time, and the motor output torque at the current time; and determining the target wheel torque according to the rotational speed of the driving motor and the predicted wheel torque at the current time.

8. The method for vehicle acceleration slip regulating according to claim 7, wherein the step of determining the target wheel torque according to the rotational speed of the driving motor and the predicted wheel torque at the current time comprises:

repeating the following steps:

determining a predicted motor rotational speed corresponding to the predicted wheel torque provided by the driving motor;

determining a torque compensation amount according to the predicted motor rotational speed and the rotational speed of the driving motor at the current time;

obtaining a deviation rectification wheel torque for compensating the predicted wheel torque according to the torque compensation amount in a case where the torque compensation amount satisfies a torque compensation condition;

taking the deviation rectification wheel torque as the motor output torque of the driving motor at the current time, and predicting again a predicted wheel torque of the vehicle according to the angular acceleration, the rotational inertia of the vehicle, the damping coefficient of the driving motor, the rotational speed of the driving motor and the deviation rectification wheel torque at the current time; and taking the predicted wheel torque as the target wheel torque until the torque compensation amount does not satisfy the torque compensation condition.

9. The method for vehicle acceleration slip regulating according to claim 8, wherein the predicted wheel torque $T_{load}$ of the vehicle is predicted by the following calculation formula:

$$w_a = (T_M - k \times w_v - T_{load})/J$$

wherein $w_a$ is the angular acceleration, J is the rotational inertia of the vehicle, k is the damping coefficient of the driving motor, $w_v$ is the rotational speed of the driving motor at the current time, and $T_M$ is the motor output torque of the driving motor at the current time.

10. A vehicle comprising:

one or more first processors; and a first memory configured to store instructions which can be executed by the first processor;

wherein the one or more first processors are collectively configured to:

obtain a vehicle speed, state information of a driving motor, and an accelerator pedal opening degree of the vehicle at a current time;

predict a target wheel torque of the vehicle according to the state information of the driving motor at the current time and state information of the driving motor at a last time of the current time; and perform acceleration slip regulation on the vehicle according to a driving mode, the vehicle speed, the accelerator pedal opening degree, a motor output torque in the state information of the driving motor and the target wheel torque at the current time.

11. The vehicle according to claim 10, wherein the one or more first processors are further collectively configured to execute the instructions stored in the first memory to implement:

determining a requested motor torque of the vehicle at the current time according to the vehicle speed of the vehicle and the accelerator pedal opening degree at the current time;

determining a torque threshold of the vehicle at the current time according to the vehicle speed and the driving mode of the vehicle at the current time; and performing acceleration slip regulation on the vehicle according to the motor output torque in the state information of the driving motor, the requested motor torque, the target wheel torque, and the torque threshold at the current time.

12. The vehicle according to claim 11, wherein the one or more first processors are further collectively configured to execute the instructions stored in the first memory to implement:

determining a torque control value according to the motor output torque in the state information of the driving motor and the target wheel torque at the current time; and performing acceleration slip regulation by reducing the requested motor torque with the target wheel torque as a target in a case where the torque control value is greater than the torque threshold on the vehicle.

13. The vehicle according to claim 12, wherein the one or more first processors are further collectively configured to execute the instructions stored in the first memory to implement:

determining a magnitude relationship between a difference between the torque control value and the torque threshold and a preset difference threshold in the case where the torque control value is greater than the torque threshold; and performing acceleration slip regulation on the vehicle by reducing the requested motor torque to the target wheel torque within a preset period of time in a case where the difference between the torque control value and the torque threshold is greater than or equal to the preset difference threshold.

14. The vehicle according to claim 13, wherein the one or more first processors are further collectively configured to execute the instructions stored in the first memory to implement:

performing acceleration slip regulation on the vehicle by reducing the requested motor torque to the target wheel torque according to a preset gradient in a case where the difference between the torque control value and the torque threshold is less than the preset difference threshold.

15. The vehicle according to claim 12, wherein the one or more first processors are further collectively configured to execute the instructions stored in the first memory to implement:

calculating a torque difference value between the motor output torque in the state information of the driving motor and the target wheel torque at the current time, and determining the torque difference value as the torque control value at the current time; or calculating a torque quotient of the motor output torque in the state information of the driving motor and the target wheel torque at the current time, and determining the torque quotient as the torque control value at the current time.

16. The vehicle according to claim 10, wherein the state information of the driving motor includes a rotational speed of the driving motor, and the one or more first processors are further collectively configured to execute the instructions stored in the first memory to implement:

determining an angular acceleration of the driving motor according to the rotational speed of the driving motor of the vehicle at the current time and a rotational speed of the driving motor at a last time of the current time; predicting a predicted wheel torque of the vehicle according to the angular acceleration, a rotational inertia of the vehicle, a damping coefficient of the driving motor, the rotational speed of the driving motor at the current time, and the motor output torque at the current time; and determine the target wheel torque according to the rotational speed of the driving motor and the predicted wheel torque at the current time.

17. The vehicle according to claim 16, wherein the one or more first processors are further collectively configured to execute the instructions stored in the first memory to implement:

repeat the following steps:

determining a predicted motor rotational speed corresponding to the predicted wheel torque provided by the driving motor;

determining a torque compensation amount according to the predicted motor rotational speed and the rotational speed of the driving motor at the current time;

obtaining a deviation rectification wheel torque for compensating the predicted wheel torque according to the torque compensation amount in a case where the torque compensation amount satisfies a torque compensation condition;

taking the deviation rectification wheel torque as the motor output torque of the driving motor at the current time, and predicting again a predicted wheel torque of the vehicle according to the angular acceleration, the rotational inertia of the vehicle, the damping coefficient of the driving motor, the rotational speed of the driving motor and the deviation rectification wheel torque at the current time; and taking the predicted wheel torque as the target wheel torque until the torque compensation amount does not satisfy the torque compensation condition.

18. The vehicle according to claim 17, wherein the one or more first processors are further collectively configured to execute the instructions stored in the first memory to implement:

predicting the predicted wheel torque $T_{load}$ of the vehicle by the following calculation formula:

$$w_a = (T_M - k \times w_v - T_{load})/J$$

where $w_a$ is the angular acceleration, J is the rotational inertia of the vehicle, k is the damping coefficient of the driving motor, $w_v$ is the rotational speed of the driving motor at the current time, and $T_M$ is the motor output torque of the driving motor at the current time.

19. A non-transitory computer-readable storage medium, having computer program instructions stored thereon, wherein when the program instructions are executed by one or more second processors of a vehicle to implement:

obtaining a vehicle speed, state information of a driving motor, and an accelerator pedal opening degree of the vehicle at a current time;

predicting a target wheel torque of the vehicle according to the state information of the driving motor at the current time and state information of the driving motor at a last time of the current time; and performing acceleration slip regulation on the vehicle according to a driving mode, the vehicle speed, the accelerator pedal opening degree, a motor output torque in the state information of the driving motor and the target wheel torque at the current time.

20. The non-transitory computer-readable storage medium according to claim 19, wherein when the program instructions are executed by the one or more second processors to implement:

determining a requested motor torque of the vehicle at the current time according to the vehicle speed of the vehicle and the accelerator pedal opening degree at the current time;

determining a torque threshold of the vehicle at the current time according to the vehicle speed and the driving mode of the vehicle at the current time; and performing acceleration slip regulation on the vehicle according to the motor output torque in the state information of the driving motor, the requested motor torque, the target wheel torque, and the torque threshold at the current time.

* * * * *